(12) United States Patent
Chen et al.

(10) Patent No.: US 11,654,493 B2
(45) Date of Patent: May 23, 2023

(54) HIGH FREQUENCY VIBRATION SPINDLE SYSTEM WITH NONCONTACT POWER TRANSMISSION AND METHOD FOR MANUFACTURING A RESTRAINING PART USED THEREIN

(71) Applicant: NATIONAL CHUNG HSING UNIVERSITY, Taichung (TW)

(72) Inventors: Jenq-Shyong Chen, Taichung (TW); Chuan-Wu Ko, Shengang Township (TW); Hao-Tang Wang, Taichung (TW)

(73) Assignee: NATIONAL CHUNG HSING UNIVERSITY, Taichung (TW)

( * ) Notice: Subject to any disclaimer, the term of this patent is extended or adjusted under 35 U.S.C. 154(b) by 719 days.

(21) Appl. No.: 16/536,051

(22) Filed: Aug. 8, 2019

(65) Prior Publication Data
US 2020/0070254 A1 Mar. 5, 2020

(30) Foreign Application Priority Data
Aug. 28, 2018 (TW) .................. 107129991

(51) Int. Cl.
*B23B 33/00* (2006.01)
*B06B 1/02* (2006.01)
(Continued)

(52) U.S. Cl.
CPC ............ *B23B 33/00* (2013.01); *B06B 1/0292* (2013.01); *B06B 1/0611* (2013.01); *B23Q 5/10* (2013.01)

(58) Field of Classification Search
CPC ......... B06B 1/045; B06B 1/04; B06B 1/0611; B06B 1/0292
(Continued)

(56) References Cited

U.S. PATENT DOCUMENTS 5,140,773 A * 8/1992 Miwa ...................... B23B 37/00
451/28
5,791,836 A * 8/1998 Feufel .................. B23Q 1/0009
408/124

(Continued)

FOREIGN PATENT DOCUMENTS

CN 101189915 A 5/2008
CN 102151867 A 8/2011
(Continued)

OTHER PUBLICATIONS

English abstract for CN106694932, Total of 1 page.
(Continued)

*Primary Examiner* — Robert F Long
*Assistant Examiner* — Xavier A Madison
(74) *Attorney, Agent, or Firm* — Apex Juris, PLLC; Tracy Heims; R Wylie

(57) ABSTRACT

A high frequency vibration spindle system with non-contact power transmission and a method for manufacturing a restraining member used therein are disclosed. The high frequency vibration spindle system comprises: an electric power transmission device including a first induction module and a second induction module, wherein the second induction module is disposed at either a spindle or a toolholder and is adapted to receive an electric power from the first induction module in a non-contact electromagnetic induction manner; a transducer adapted to vibrate the tool and disposed at the toolholder and electrically connected with the second induction module to receive the electric power; and-a restraining member located between the first induction module and the second induction module. With the restraining member, the structural strength and stability of the second induction module can be improved, thereby (Continued)

increasing the maximum rotational speed of the high frequency vibration spindle system.

16 Claims, 8 Drawing Sheets

(51) Int. Cl.
*B06B 1/06* (2006.01)
*B23Q 5/10* (2006.01)

(58) Field of Classification Search
USPC .................................................. 173/162.1
See application file for complete search history.

(56) References Cited

U.S. PATENT DOCUMENTS

| | | | | |
|---|---|---|---|---|
| 8,240,396 B2* | 8/2012 | Sauer | ................... | B23B 37/00 335/229 |
| 8,926,235 B2* | 1/2015 | Moraru | ................... | B23B 37/00 82/904 |
| 10,570,985 B2* | 2/2020 | Chen | ................... | B24B 1/04 |
| 2003/0001456 A1* | 1/2003 | Kauf | ................... | B06B 3/00 310/323.18 |
| 2014/0083623 A1* | 3/2014 | Jurzitza | ................... | B32B 37/06 228/1.1 |
| 2015/0352713 A1* | 12/2015 | Takazakura | ................ | B25H 5/00 173/2 |

FOREIGN PATENT DOCUMENTS

| | | |
|---|---|---|
| CN | 103259347 A | 8/2013 |
| CN | 204159886 U | 2/2015 |
| CN | 204294942 U | 4/2015 |
| CN | 106694932 A | 5/2017 |
| CN | 107262745 A | 10/2017 |
| CN | 109676166 A | 4/2019 |
| CN | 109894635 A | 6/2019 |
| CN | 209062153 U | 7/2019 |
| CN | 209379931 U | 9/2019 |
| CN | 110508834 A | 11/2019 |
| CN | 209811269 U | 12/2019 |
| EP | 1902798 A1 | 3/2008 |
| EP | 2735392 A1 | 5/2014 |
| EP | 2946859 A1 | 11/2015 |
| EP | 3017908 A2 | 5/2016 |
| EP | 3100805 A1 | 12/2016 |
| TW | M558670 U | 4/2018 |

OTHER PUBLICATIONS

English abstract for CN209379931, Total of 1 page.
English abstract for CN209062153, Total of 1 page.
English abstract for CN109894635, Total of 1 page.
English abstract for CN107262745, Total of 1 page.
English abstract for CN204159886, Total of 1 page.
English abstract for CN209811269, Total of 1 page.
English abstract for CN110508834, Total of 1 page.
English abstract for CN109676166, Total of 1 page.
Search report for CN201910659447.2, dated Mar. 29, 2021, Total of 1 page.
English Abstract for CN101189915, Total of 1 page.
English Abstract for CN204294942, Total of 1 page.
English Abstract for TWM558670, Total of 1 page.
English abstract for CN102151867, Total of 1 page.
English abstract for CN103259347, Total of 1 page.
Annex to European Search and Examination Report for EP19191725.1, dated Jan. 10, 2020.

* cited by examiner

HIGH FREQUENCY VIBRATION SPINDLE SYSTEM WITH NONCONTACT POWER TRANSMISSION AND METHOD FOR MANUFACTURING A RESTRAINING PART USED THEREIN

BACKGROUND OF THE INVENTION

Technical Field

The present invention relates to a machining device; in particular, to a high frequency vibration spindle system with non-contact power transmission for rotational vibration processing and a method for manufacturing a restraining part used therein.

Description of Related Art

Among the field of machining facilities, with the rapid development of science and technology, there is an increasing demand for processing high hardness or brittle materials which are difficult to machine or grind, and therefore the demand for the processing quality and efficiency of the machining tool are also getting higher. Therefore, it becomes more common to use a vibration assisted spindle system which could generates a high frequency vibration on the tool to process a workpiece, such as grinding, cutting or hole-drilling. In particular, the aforementioned processing method not only enables the micro-particles being separated from the surface of the workpiece under the high frequency vibration, which could reduce the processing debris or mold debris, and thereby to mitigate the cutting resistance and extend the service life of the tool, but also makes the surface of the workpiece smoother so as to improve the fineness and quality of the workpiece.

The current development of the spindle system is the rotating spindle with non-contact power transmission function. However, due to the deficiencies in structural design of the conventional spindle system, the speed maximum of the spindle cannot be further increased, otherwise the centrifugal force generated during the rotation of the spindle will cause the electric power transmission device of the spindle system to rupture and disintegrate. Therefore, the existing spindle system still needs improvements.

BRIEF SUMMARY OF THE INVENTION

In view of the above, the objective of the present invention is to provide a high frequency vibration spindle system that can strengthen and reinforce the structural strength of the electric power transmission device of the spindle system to improve the performance of the spindle system and break through the limit of the maximum spindle speed.

In order to achieve the above objects, the present invention provides a high frequency vibration spindle system with non-contact power transmission, comprising: a spindle; a toolholder detachably mounted on the spindle and adapted to engage with a tool; an electric power transmission device, including a first induction module and a second induction module spaced apart from each other with a gap, wherein the second induction module is disposed at the spindle or the toolholder, and the second induction module is adapted to receive an electric power from the first induction module in a non-contact electromagnetic induction manner; a transducer, adapted to be controlled to vibrate the tool and being disposed at the toolholder and electrically connected with the second induction module to receive the electric power; and a restraining part provided on the second induction module and located between the first induction module and the second induction module.

In an embodiment, the second induction module includes a ferrite core and a coil, the ferrite core is formed in a ring shape, the coil fits around an exterior circumference of the ferrite core, and the restraining part wraps around the ferrite core and the coil.

In an embodiment, the second induction module includes a ferrite core and a coil, the ferrite core is formed in a ring shape and has two protrusions protruding radially outward and a recess between the two protrusions, the coil fits around the recess of the ferrite core, and the restraining part is at least located between one of the two protrusions and the first induction module.

In an embodiment, the restraining part includes a first portion and a second portion, the first portion is located between one of the two protrusions and the first induction module, and the second portion is located between the other of the two protrusions and the first induction module.

In an embodiment, the first portion and the second portion are separately disposed on the two protrusions.

In an embodiment, the restraining part is made of a non-magnetic material.

In an embodiment, the restraining part is made of a composite material.

In an embodiment, the restraining part is made of carbon fibers.

In an embodiment, the restraining part winds around an exterior circumference of the second induction module to provide a restraint force for counteracting a centrifugal force generated when the second induction module rotates.

In an embodiment, the restraining part includes at least one layer of a carbon fiber material wound around an exterior circumference of the second induction module, and the thickness of the restraining part is between 0.25 mm and 5 mm.

In an embodiment, the restraining part further includes a composite material sleeved on the exterior of the carbon fiber material.

In order to achieve the above objects, the present invention provides a method for manufacturing a restraining part used in a high frequency vibration spindle system. The high frequency vibration spindle system includes a first induction module and a second induction module. The second induction module is adapted to receive an electric power from the first induction module in a non-contact electromagnetic induction manner, and the second induction module includes a ferrite core and a coil. The restraining part wraps around the ferrite core. The method comprises the steps of: winding a carbon fiber material pre-impregnated with a first adhesive around the ferrite core with a predetermined restraint force; and baking the ferrite core for a predetermined time to cure the first adhesive on the carbon fiber material.

In an embodiment, the ferrite core has two protrusions protruding radially outward and a recess between the two protrusions; and the coil fits around the recess of the ferrite core. Further, in step A, the carbon fiber material is wound beyond the two protrusions.

In an embodiment, after the baking is completed, portions of the carbon fiber material beyond the two protrusions are removed so that the carbon fiber material is flush with the two protrusions.

In an embodiment, after the baking is completed, a sleeve made of a composite material is sleeved on the ferrite core, such that an inner surface of the sleeve wraps around the ferrite core and the carbon fiber material. In particular, the sleeve is internally coated with a second adhesive. Next, cure the second adhesive such that the composite material is fixed to the carbon fiber material and the ferrite core.

In an embodiment, the method further comprises disposing a composite material at the exterior of the ferrite core in advance, and the carbon fiber material wraps around the composite material such that the composite material is located between the ferrite core and the carbon fiber material.

The advantage of the present invention is that the design of the restraining part can help to provide the second induction module with an appropriate restraint force, such that when the second induction module rotates, the ferrite core can be appropriately restrained to counteract the centrifugal force generated during rotation. Consequently, the structural strength of the high frequency vibration spindle system can be improved, and the maximum rotational speed of the high frequency vibration spindle system can be increased.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
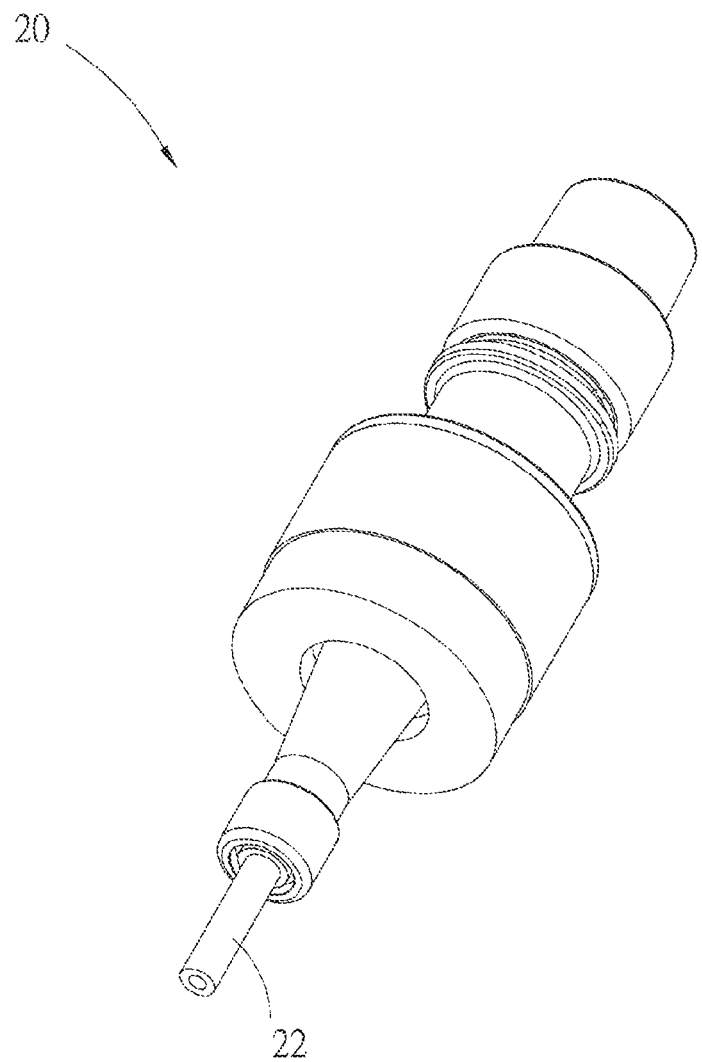
FIG. 1 is a perspective view showing a toolholder of a high frequency vibration spindle system according to a first embodiment of the present invention.
Figure 2:
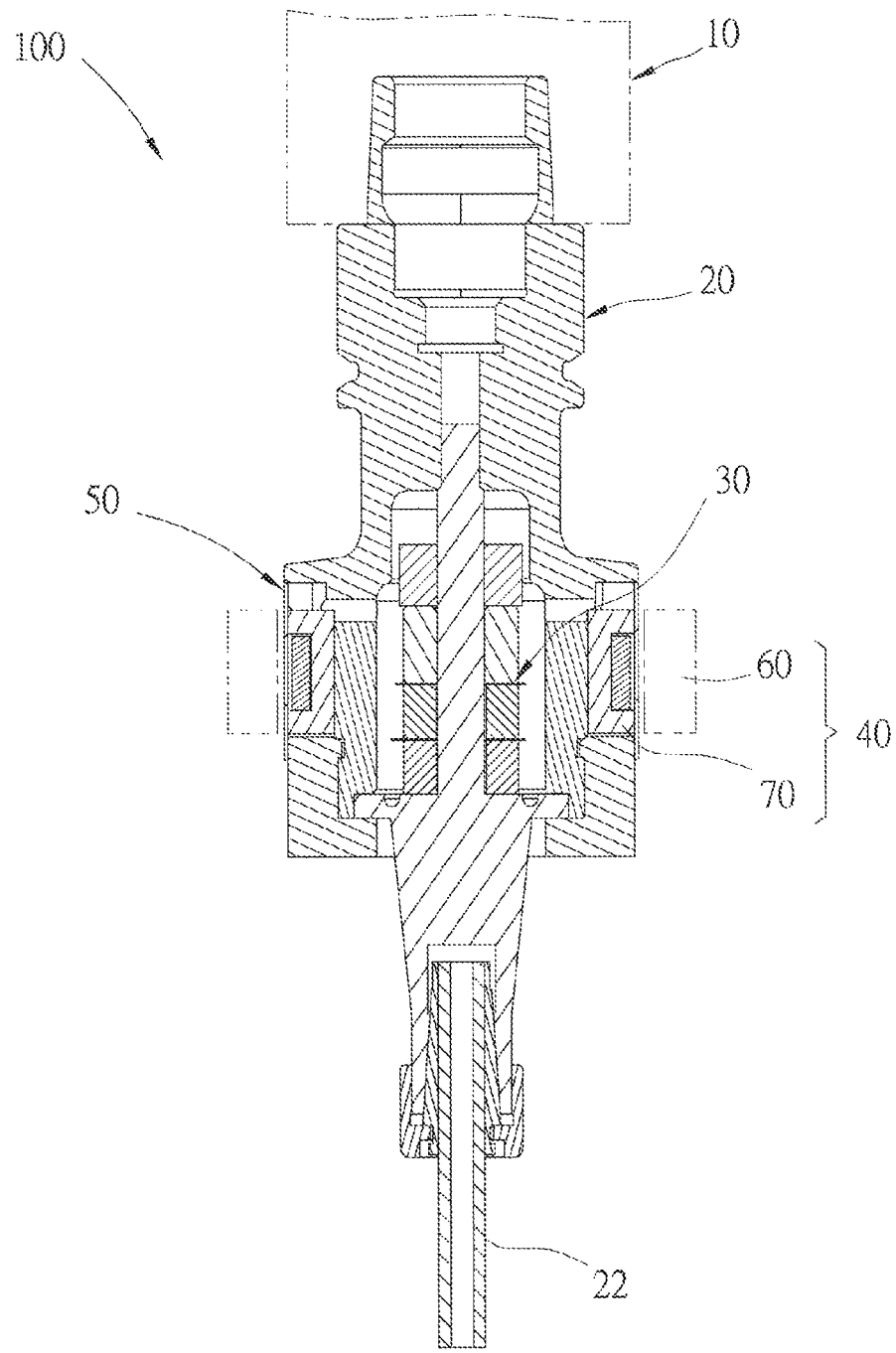
FIG. 2 is a cross-sectional view showing the toolholder of the high frequency vibration spindle system according to the first embodiment of the present invention.
Figure 3:
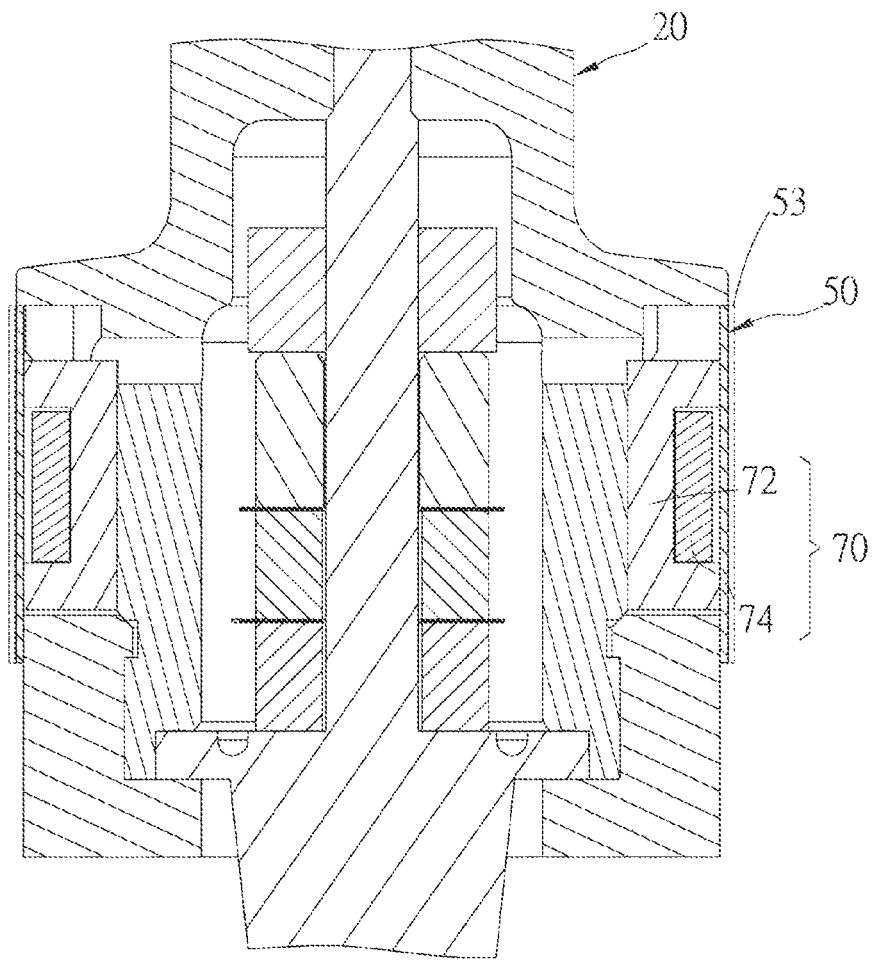
FIG. 3 is a partially enlarged cross-sectional view of the high frequency vibration spindle system of FIG. 2.

The following illustrative embodiments and drawings are provided to illustrate the disclosure of the present invention, these and other advantages and effects can be clearly understood by persons skilled in the art after reading the disclosure of this specification. As illustrated in FIG. 1 to FIG. 3, a high frequency vibration spindle system 100 of a first embodiment according to the present invention includes a spindle 10, a toolholder 20, a transducer 30, an electric power transmission device 40, and a restraining part 50.

The toolholder 20 is detachably coupled to the spindle 10 and adapted to engage with a tool 22 for machining a workpiece. In practice, the toolholder is coupled to the rotating part of the spindle. For example, in an embodiment, the spindle includes a housing and a spindle shaft, and the spindle shaft is rotatably coupled to the housing, and the toolholder is coupled to and driven by the spindle shaft to rotate.

The transducer 30 is disposed at the toolholder 20 and adapted to be controlled to drive the tool 22 connected with the toolholder 20 to vibrate. For example, in the present embodiment, the transducer 30 is disposed in the interior accommodating space of the toolholder 20. The transducer 30 can be made of a capacitive element or a piezoelectric element, such as a piezoelectric ceramic material, which could be driven by an electric power to generate high frequency vibration, thereby directly or indirectly driving the tool 22 provided on the toolholder 20 to vibrate.

The electric power transmission device 40 includes a first induction module 60 and a second induction module 70. The first induction module 60 is electrically connected to a power supply (not shown) to receive an electric power provided therefrom. The first induction module 60 is further adapted to transmit the electric power to the second induction module 70. The second induction module 70 is spaced apart from the first induction module 60 with a gap, whereby the second induction module 70 could receive the electric power by a non-contact induction with the first induction module 60. In addition, a CNC controller can be connected to the power to provide a control signal to the power and the transducer, which is based on the requirement of the workpiece or the processing, thereby to produce a vibration wave and a frequency corresponding to the requirement.

In an embodiment, the first induction module 60 is mounted on the spindle 10, and the second induction module 70 is mounted on the toolholder 20. Further, in the present embodiment, the outer peripheral surface of the toolholder 20 is formed with a coupling groove, in which the second induction module 70 is disposed and thus mounted on the toolholder 20. In addition, in the embodiment, the second induction module 70 includes a ferrite core 72 and a coil 74. The ferrite core 72 is made of a ceramic material by using a powder die casting technique, and the ferrite core 72 is formed in a ring shape and circumferentially disposed on the toolholder 20. The coil 74 fits around an exterior circumference of the ferrite core 72.

The restraining part 50 is disposed on the second induction module 70 and located between the first induction module 60 and the second induction module 70 for fixing and positioning the second induction module. 70. In an embodiment, the restraining part 50 is annular and sleeved on an exterior circumference of the second induction module 70, so that the second induction module 70 is located between the restraining part 50 and the toolholder 20. Furthermore, in an embodiment, the restraining part 50 is wound around the exterior circumference of the second induction module 70 in a winding manner so as to provide an appropriate restraining force to the second induction module 70 to counteract the centrifugal force generated during the rotation of the second induction module 70.

In addition, preferably, the restraining part 50 is made of a non-magnetic material, thereby effectively providing not only a good restraining effect of the second induction module 70 but also reinforcement of the structural strength of the second induction module 70 to counteract, offset or mitigate the centrifugal force generated during the rotation of the toolholder 20 together with the second induction module 70. Since the restraining part 50 is made of a non-magnetic material, it does not affect the transmission efficiency of the electromagnetic induction between the first induction module 60 and the second induction module 70. In addition, in a circumstance, when the second induction module 70 is broken, for example, when the ferrite core 72 or the coil 74 is broken, through the design of the restraining part 50 wound around the second induction module 70, the debris broken from the second induction module 70 can be prevented from flying out due to the restraint and packing effects of the restraining part 50, and thus the safety of using the high frequency vibration spindle system 100 can be improved.

It is worth mentioning that, in an embodiment, preferably, the restraining part 50 is made of a composite material. The composite material has the advantages that it has higher structural strength than the metal material, good tensile strength (tearing strength) and high tension, and low density, small specific gravity, light weight and other characteristics, all of which can contribute to lightweight design. Further, preferably, the restraining part 50 is mainly made of carbon fibers, but not limited thereto. In other applications, other composite materials or fibers, such as glass fiber, ceramic fiber, aramid fiber, carbide fiber, etc. may also be used. In addition, in an embodiment, the restraining part 50 is formed by winding at least one layer of the sheet shaped carbon fiber material around the exterior circumference of the second induction module 70. Preferably, the thickness of the restraining part 50 is between 0.25 mm and 5 mm. In this way, a good balance can be achieved between providing sufficient structural support strength and material cost. In addition, in an embodiment, the restraining part 50 may further include a composite material 53 wrapping the exterior of the carbon fiber material. The composite material 53 may be selected from, but not limited to, engineering plastics, thereby further strengthening the restraining effect of the restraining part 50 on the second induction module 70.

Figure 4:
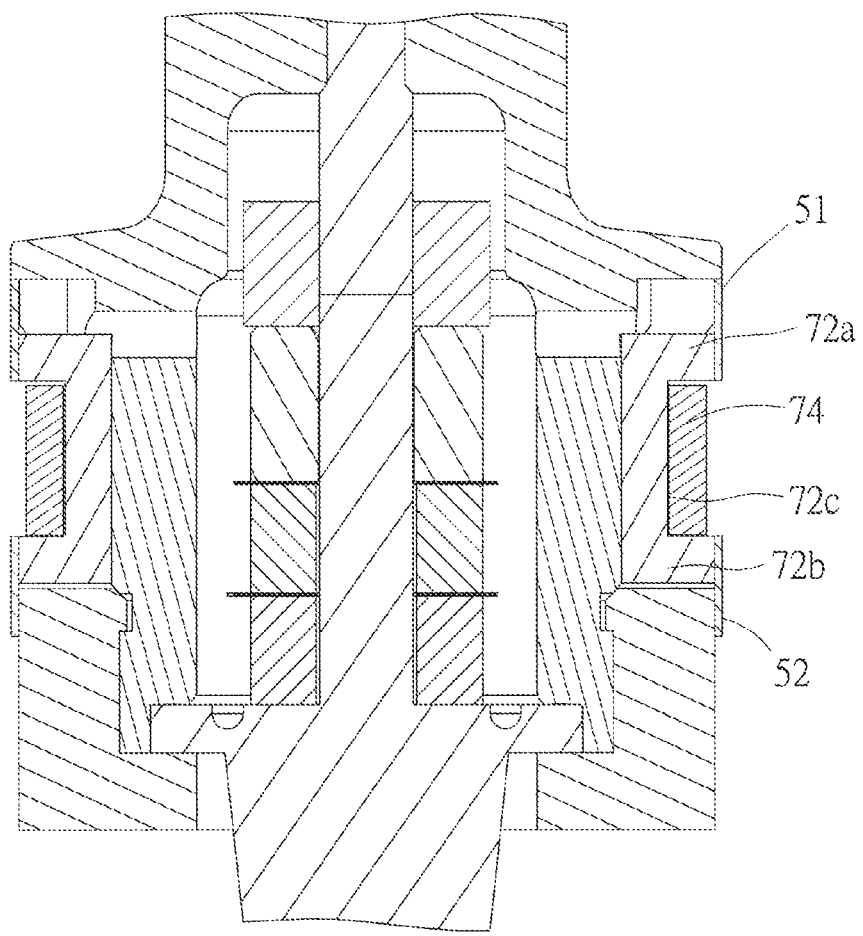
FIG. 4 is a partially enlarged cross-sectional view showing a toolholder of a high frequency vibration spindle system according to another embodiment of the present invention, wherein another type of the restraining part is disclosed.

In the first embodiment described above, the restraining part 50 completely wraps the second induction module 70, i.e. completely wraps and covers the ferrite core 72 and the coil 74, but in other applications, it is not limited thereto. For example, as shown in FIG. 4, in an embodiment, the ferrite core has two protrusions 72a, 72b protruding radially outward, and a recess 72c between the two protrusions 72a, 72b. A coil 74 is disposed in the recess 72c and located between the two protrusions 72a, 72b. The restraining part 50 includes a first portion 51 and a second portion 52, which are separately disposed on the two protrusions 72a, 72b and not cover the coil 74. The first portion 51 is located between the protrusion 72a and the first induction module (not shown), and the second portion 52 is located between the other protrusion 72b and the first induction module. Through the design of the first portion 51 and the second portion 52 of the restraining part 50 respectively covering the two protrusions 72a, 72b of the ferrite core 72, it is possible to provide the ferrite core 72 with appropriate supporting force effectively, thereby counteracting, offsetting or alleviating the centrifugal force generated when the ferrite core 72 rotates.

In an embodiment, the restraining part includes a first composite material wound around the exterior circumference of the second induction module 70, and a second composite material sleeved on the first composite material. For example, in the foregoing embodiment, the first composite material is exemplified by the carbon fiber material, and the second composite material is exemplified by the engineering plastic, but in other applications, it is not limited thereto. In some embodiments, the second composite material may further be the carbon fiber tube. In addition, in certain embodiments, the first composite material may be the engineering plastic, and the second composite material may be the carbon fiber tube or the engineering plastic sleeves.

Figure 5:
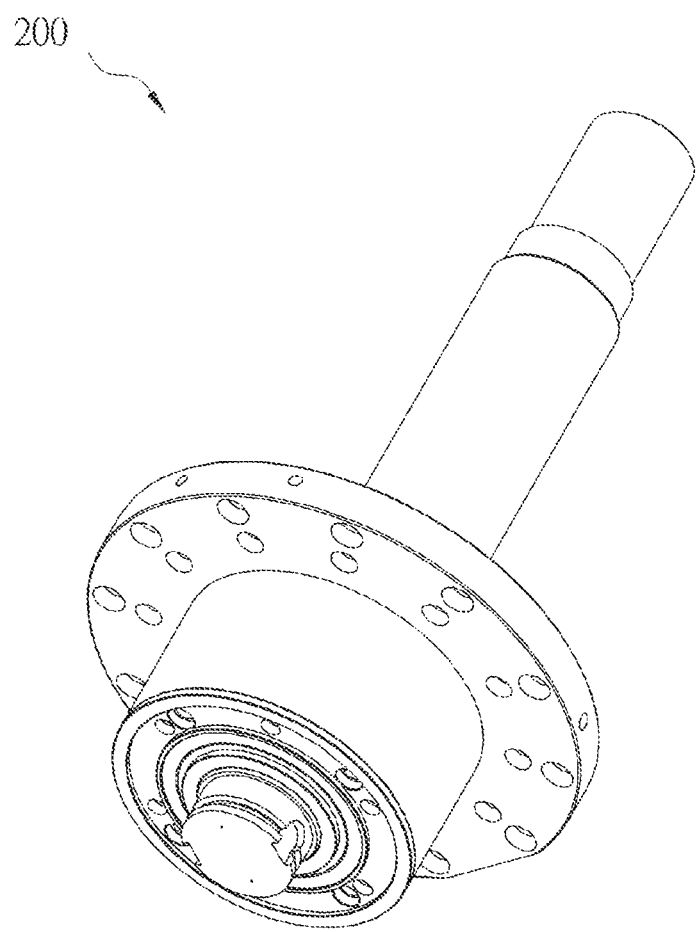
FIG. 5 is a perspective view showing a high frequency vibration spindle system according to a second embodiment of the present invention.
Figure 6:
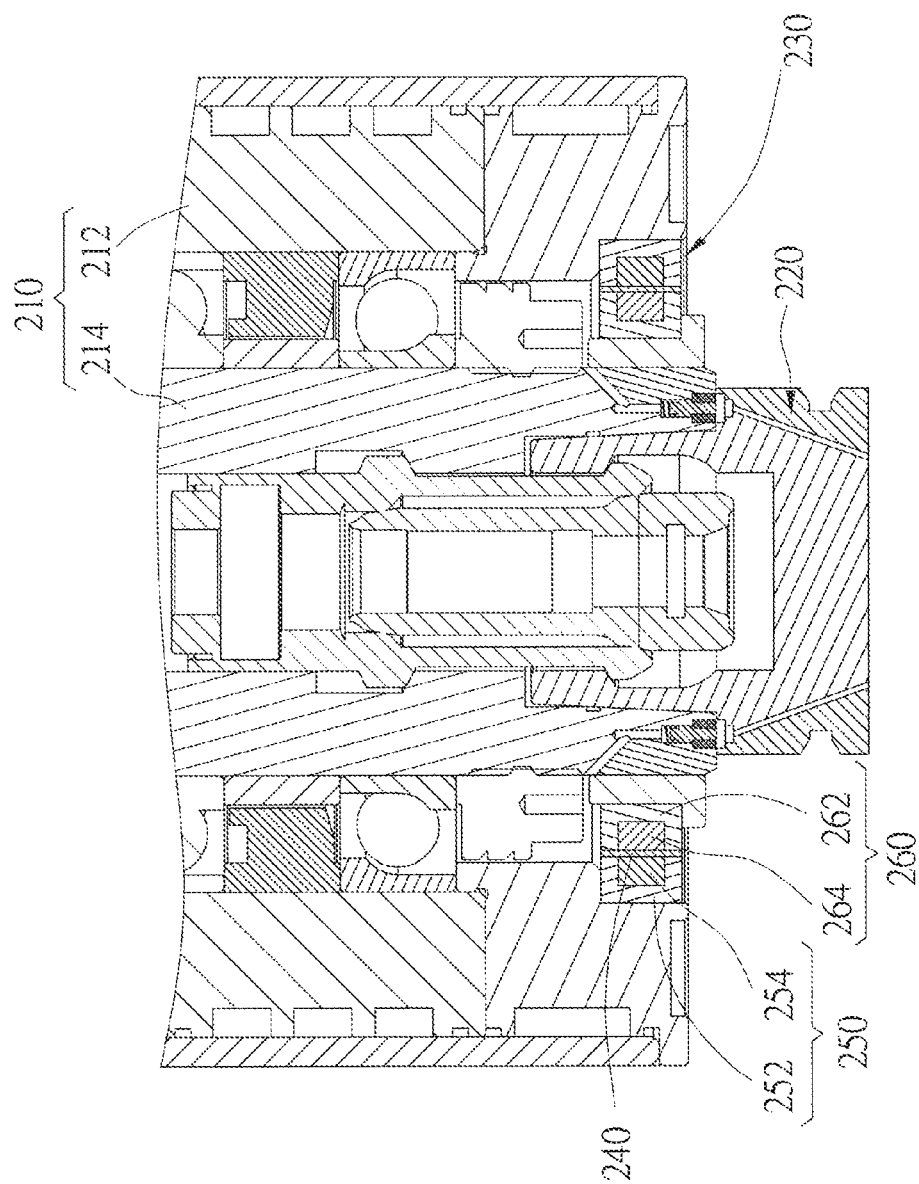
FIG. 6 is a partially enlarged cross-sectional view showing the high frequency vibration spindle system according to the second embodiment of the present invention.

Referring to FIG. 5 and FIG. 6, a high frequency vibration spindle system 200 according to a second embodiment of the present invention has substantially the same infrastructure as that of the foregoing embodiment, and both have a spindle 210, a toolholder 220, and an electric power transmission device 230, a transducer (not shown), and a restraining part 240.

The spindle 210 includes a housing 212 and a spindle shaft 214. The spindle 214 is disposed in the housing 212 and rotatable relative to the housing 212. The toolholder 220 is engaged with the spindle shaft 214 and can be rotated by the driving of the spindle shaft 214.

The electric power transmission device 230 is substantially the same as that of the previous embodiment and has a first induction module 250 and a second induction module 260. In particular, the first induction module 250 is disposed on the housing 212 and includes a first ferrite core 252 and a first coil 254. The first ferrite core 252 has a ring shape, and the first coil 254 is disposed on the inner circumference of the first ferrite core. The second induction module 260 is disposed on the spindle shaft 214 and surrounds the spindle shaft 214. The second induction module 260 includes a second ferrite core 262 and a second coil 264. The ferrite core 262 is in a ring shape, and the second coil 264 is disposed on an exterior circumference of the second ferrite core 262. The second ferrite core 262 faces the first ferrite core 252 in the radial direction. In particular, both the first ferrite core 252 and the second ferrite core 262 have a symmetrical lying U-shaped cross-section in the axial direction, that is, both sides of the first ferrite core 252 and the second ferrite core 262 respectively have a protrusion extending in the radial direction, and a recess is formed between the protrusions for accommodating the corresponding coils (the first coil and the second coil). Through the above design, in addition to the assistance in accommodating and positioning the coil, the ferrite core structure further has the advantages of simplicity in structure and compactness in volume, which helps to reduce the manufacturing time and production cost of the ferrite core, and thus has advantages in mass production as well as low-cost production.

The restraining part 240 is disposed on the second induction module 260 and located between the first induction module 250 and the second induction module 260. The material selection and structure of the restraining part 240 are substantially the same as those of the restraining part 50 of the first embodiment, and the details thereof are not repeated hereinafter.

Figure 7:
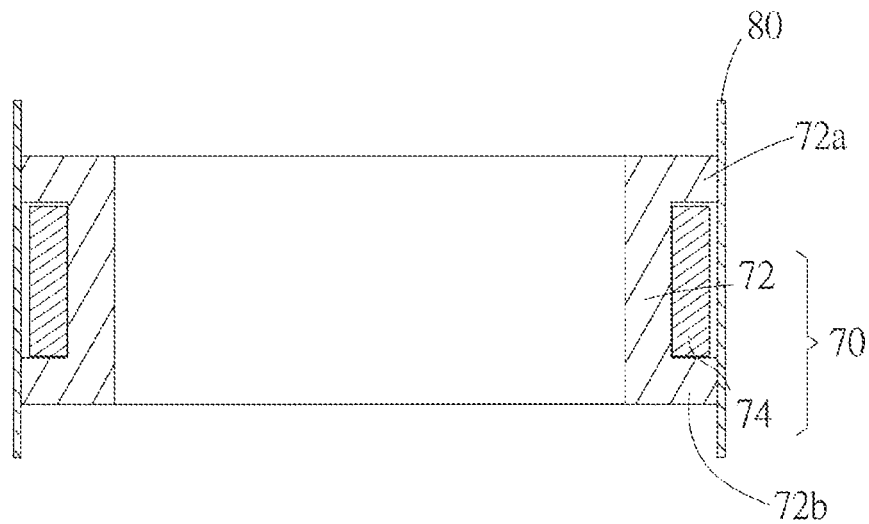
FIGS. 7-9 are schematic views showing a method for manufacturing a restraining part of a high frequency vibration spindle system according to the present invention.
Figure 8:
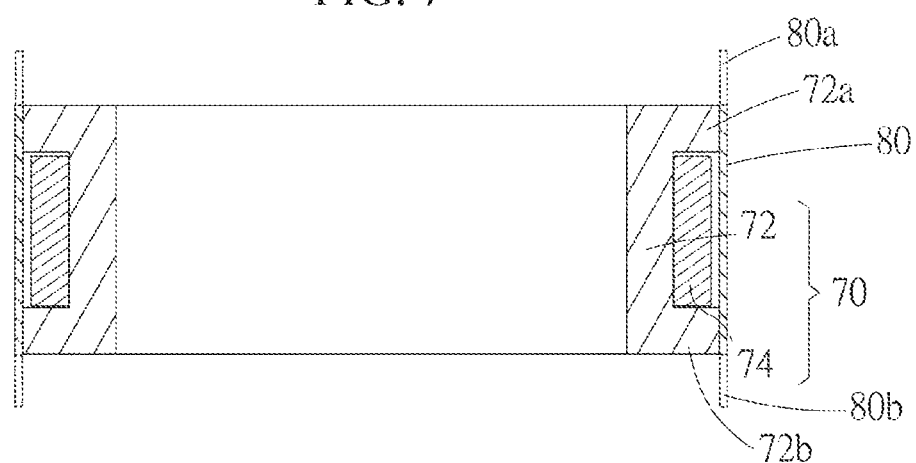
Figure 9:
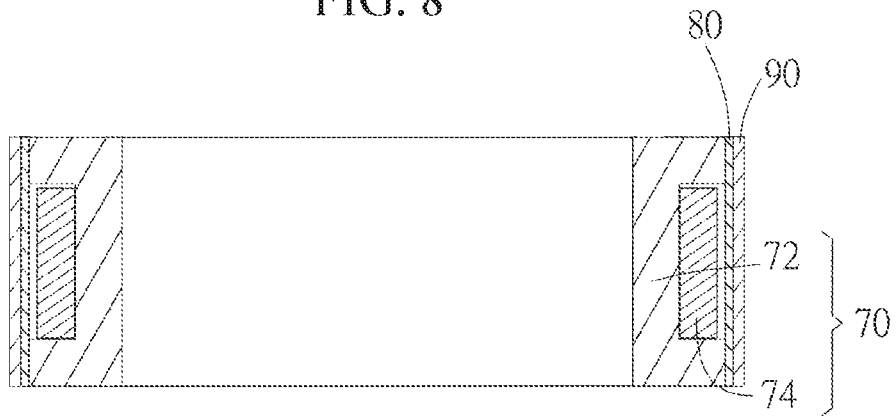

With reference to FIGS. 7-9, a method for manufacturing a restraining part applied to a high frequency vibration spindle system will be described hereinafter. The high frequency vibration spindle system is the same as that of the first and second embodiments described above, and the details thereof will not be repeated hereinafter. The method for manufacturing the restraining part of the present invention comprises the following steps.

The coil 74 is disposed on the exterior circumference of the ferrite core 72. The ferrite core 72 and the coil 74 are the same as those of the first embodiment described above, and the details thereof will not be described hereinafter again.

A carbon fiber material 80 (for example, a carbon fiber cloth) pre-impregnated with a first adhesive which is a resin as an example is wound around the ferrite core 72 with a predetermined restraint force. Preferably, in the present embodiment, when winding, the carbon fiber material 80 is wound beyond the two protrusions 72a, 72b of the ferrite core 72. For example, in the embodiment, the width of the wound area beyond the two protrusions 72a, 72b is approximately between 0.25 mm and 10 mm.

Next, the ferrite core 72 wound with the carbon fiber material 80 is baked for a predetermined time to cure the resin on the carbon fiber material 80. Among them, the baking temperature can be selected from 80° C. to 170° C., and when the higher temperature is selected, the required baking time can be shortened. In addition, the selected baking temperature is preferably set according to the material of the ferrite core 72. Further, in one embodiment, the selected baking temperature is preferably not higher than the Curie temperature of the ferrite core 72.

Subsequently, after the baking is completed, a sleeve 90 internally coated with a second adhesive which is an anaerobic adhesive as an example is sleeved on the ferrite core 72 such that the inner surface of the sleeve 90 wraps the ferrite core 72 and the carbon fiber material 80. Preferably, after the baking is completed, as shown in FIG. 7 and FIG. 8, the portions 80a, 80b of the carbon fiber material 80 beyond the two protrusions 72a, 72b are first removed so that the carbon fiber material 80 is flush with the two protrusions 72a, 72b, and then the sleeve 90 is sleeved on the exterior circumference of the ferrite core 72, as shown in FIG. 9.

Thereafter, cure the second adhesive. In the current embodiment, the ferrite core 72 is coated with an oxygen insulation material which is an oil as an example (e.g. rust preventive oil) to cure the anaerobic adhesive on the sleeve 90, so that the sleeve 90 is fixed to the carbon fiber material 80 and the ferrite core 72, thereby forming the restraining part that provides an appropriate restraint force to the ferrite core 72.

Figure 10:
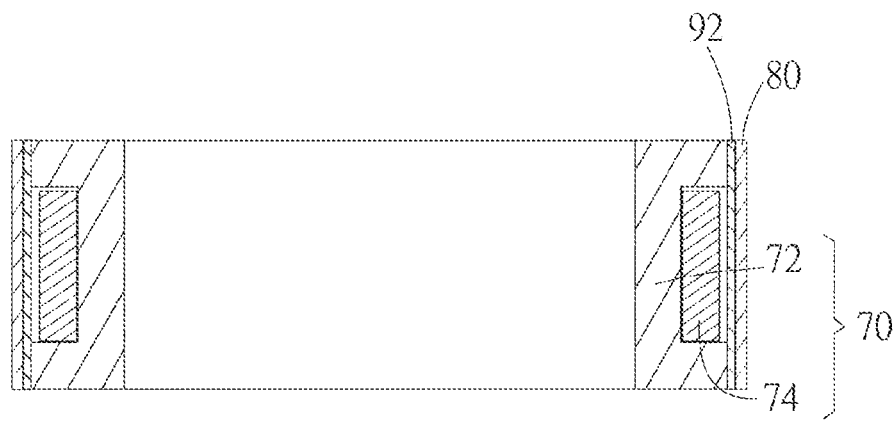
FIG. 10 is a schematic view showing a method for manufacturing a restraining part according to another embodiment of the present invention.

In addition, as shown in FIG. 10, in an embodiment, before the carbon fiber material is wound, a composite material 92 may be disposed in advance outside the ferrite core 72, in which the composite material 92 may be, but is not limited to, the engineering plastic. Afterwards, the carbon fiber material 80 is wound around the composite material 92 and the ferrite core 72, so that the composite material is located between the ferrite core 72 and the carbon fiber material 80. Then the carbon fiber material 80 undergoes a baking step such that the carbon fiber material 80 is cured after baking to become the restraining part that can provide the ferrite core 72 with a proper restraint force.

Through the above design, the method for manufacturing the restraining part of the present invention proceeds the manufacture in the form of parts, which means a plurality of the second induction modules provided with the restraining parts can be manufactured first, and then the second induction modules provided with the restraining parts are applied to the electric power transmission device and disposed at the spindle or the toolholder, thereby improving the convenience of manufacturing and the production efficiency. The assembly of the restraining part need not to wait for the complete installation of the high frequency vibration spindle system.

Therefore, the design of the restraining part can help provide the restraint force for positioning and fixing the second induction module, thereby effectively restraining the position of the ferrite core when the second induction module rotates in order to counteract, alleviate or offset the centrifugal force generated during rotation. Consequently, the structural strength of the high frequency vibration spindle system can be effectively improved, and the maximum rotational speed of the high frequency vibration spindle system can be increased.

It must be pointed out that the embodiments described above are only some embodiments of the present invention. All equivalent structures which employ the concepts disclosed in this specification and the appended claims should fall within the scope of the present invention.

What is claimed is:

1. A high frequency vibration spindle system with non-contact power transmission, comprising:
    a spindle;
    a toolholder detachably mounted on the spindle and adapted to engage with a tool;
    an electric power transmission device, including a first induction module and a second induction module spaced apart from each other with a gap, wherein the second induction module is disposed at the spindle or the toolholder, and the second induction module is adapted to receive an electric power from the first induction module in a non-contact electromagnetic induction manner;
    a transducer, adapted to be controlled to vibrate the tool and being disposed at the toolholder and electrically connected with the second induction module to receive the electric power; and
    a restraining member provided on the second induction module and located between the first induction module and the second induction module;
    wherein the restraining member includes at least one layer of a sheet shaped carbon fiber material wound around an exterior circumference of the second induction module, and the thickness of the restraining member is between 0.25 mm and 1.5 mm.

2. The high frequency vibration spindle system of claim 1, wherein the restraining member is made of a non-magnetic material.

3. The high frequency vibration spindle system of claim 1, wherein the restraining member is made of a composite material.

4. The high frequency vibration spindle system of claim 3, wherein the restraining member is made of carbon fibers.

5. The high frequency vibration spindle system of claim 1, wherein the restraining member winds around an exterior circumference of the second induction module to provide a restraint force for counteracting a centrifugal force generated when the second induction module rotates.

6. The high frequency vibration spindle system of claim 1, wherein the second induction module includes a ferrite core and a coil, the ferrite core is formed in a ring shape, the coil fits around an exterior circumference of the ferrite core, and the restraining member wraps around the ferrite core and the coil.

7. The high frequency vibration spindle system of claim 1, wherein the restraining member further includes a composite material sleeved on the exterior of the carbon fiber material.

8. The high frequency vibration spindle system of claim 1, wherein the restraining member includes a first composite material wound around an exterior circumference of the second induction module and a second composite material sleeved on the first composite material.

9. The high frequency vibration spindle system of claim 1, wherein the second induction module includes a ferrite core and a coil, the ferrite core is formed in a ring shape and has two protrusions protruding radially outward and a recess between the two protrusions, the coil fits around the recess of the ferrite core, and the restraining member is at least located between one of the two protrusions and the first induction module.

10. The high frequency vibration spindle system of claim 9, wherein the restraining member includes a first portion and a second portion, the first portion is located between one of the two protrusions and the first induction module, and the second portion is located between the other of the two protrusions and the first induction module.

11. The high frequency vibration spindle system of claim 10, wherein the first portion and the second portion are separately disposed on the two protrusions.

12. A method for manufacturing a restraining member used in a high frequency vibration spindle system, wherein the high frequency vibration spindle system includes a first induction module and a second induction module, the second induction module is adapted to receive an electric power from the first induction module in a non-contact electromagnetic induction manner, the second induction module includes a ferrite core and a coil, the restraining member wraps around the ferrite core, comprising the steps of:
A. winding a carbon fiber material pre-impregnated with a resin around the ferrite core with a predetermined restraint force; and
B. baking the ferrite core for a predetermined time to cure the resin on the carbon fiber material.

13. The method of claim 12, wherein the ferrite core has two protrusions protruding radially outward and a recess between the two protrusions; the coil fits around the recess of the ferrite core; and in step A, the carbon fiber material is wound beyond the two protrusions.

14. The method of claim 13, wherein after the baking is completed, portions of the carbon fiber material beyond the two protrusions are removed so that the carbon fiber material is flush with the two protrusions.

15. The method of claim 12, further comprising the following steps after step B:
C. after the baking, sleeving a sleeve made of a composite material on the ferrite core, wherein an inner surface of the sleeve wraps around the ferrite core and the carbon fiber material, and the sleeve is internally coated with an anaerobic adhesive; and
D. coating the ferrite core with a rust preventive oil to cure the anaerobic adhesive such that the composite material is fixed to the carbon fiber material and the ferrite core.

16. The method of claim 12, further comprising disposing a composite material at the exterior of the ferrite core before step A, wherein in step A the carbon fiber material wraps around the composite material such that the composite material is located between the ferrite core and the carbon fiber material.

* * * * *